United States Patent
Patel et al.

(10) Patent No.: US 11,138,906 B2
(45) Date of Patent: Oct. 5, 2021

(54) BREASTFEEDING SIMULATION SYSTEM

(71) Applicant: Purdue Research Foundation, West Lafayette, IN (US)

(72) Inventors: Neal Minesh Patel, Chesterton, IN (US); Jennifer Nicole Ray, Clarkston, IN (US); Daniel Joseph Romary, New Haven, IN (US); Alexandria Melony Sacopulos, Pittsburg, PA (US)

(73) Assignee: Purdue Research Foundation, West Lafayette, IN (US)

( * ) Notice: Subject to any disclaimer, the term of this patent is extended or adjusted under 35 U.S.C. 154(b) by 312 days.

(21) Appl. No.: 16/383,621

(22) Filed: Apr. 14, 2019

(65) Prior Publication Data

US 2019/0318662 A1    Oct. 17, 2019

Related U.S. Application Data

(60) Provisional application No. 62/659,028, filed on Apr. 17, 2018.

(51) Int. Cl.
*G09B 23/30* (2006.01)
*G09B 23/32* (2006.01)
*G09B 23/34* (2006.01)

(52) U.S. Cl.
CPC .......... *G09B 23/32* (2013.01); *G09B 23/34* (2013.01)

(58) Field of Classification Search
CPC .............................. G09B 23/28; G09B 23/30
USPC ................. 434/262, 267, 270, 273
See application file for complete search history.

(56) References Cited

U.S. PATENT DOCUMENTS

| | | | |
|---|---|---|---|
| 4,249,337 A | 2/1981 | Edson | |
| 4,575,351 A | 3/1986 | Gonzalez | |
| 4,815,977 A | 3/1989 | Peters | |
| 6,604,980 B1 * | 8/2003 | Jurmain | A63H 3/001 434/238 |
| 6,669,064 B2 * | 12/2003 | Perricone | A61J 9/001 215/11.3 |
| 7,207,336 B1 * | 4/2007 | Doiron | A61F 13/141 128/846 |
| 7,329,247 B2 * | 2/2008 | Wallace | A61M 1/062 604/500 |
| D576,283 S | 9/2008 | Marshall et al. | |
| 9,430,955 B2 | 8/2016 | Daullary | |
| 2009/0233518 A1 * | 9/2009 | Hui | A63H 3/28 446/301 |

(Continued)

OTHER PUBLICATIONS

"Parents' fury as breastfeeding doll for young girls goes on sale", Daily Mail, Aug. 5, 2009 [retrieved online Apr. 19, 2021]. (Year: 2009).*

*Primary Examiner* — Kurt Fernstrom
(74) *Attorney, Agent, or Firm* — Piroozi-IP, LLC

(57) ABSTRACT

A breastfeeding simulation system (BSS). The BSS includes a breast prosthesis having a pliable nipple, and a baby mannequin configured to interface with the breast prosthesis, the baby mannequin includes an articulating head, a motorized jaw, the articulating head further includes a mouth normally placed in a closed position by the motorized jaw, where the motorized jaw opens when an object is detected near the mouth and the baby mannequin is positioned according to a predetermined angular position, and a palate sensor, configured to provide a proper placement signal when the pliable nipple is placed at a predetermined position.

20 Claims, 8 Drawing Sheets

(56) References Cited

U.S. PATENT DOCUMENTS

2016/0293059 A1* 10/2016 Rigert .................... A61J 17/113

* cited by examiner

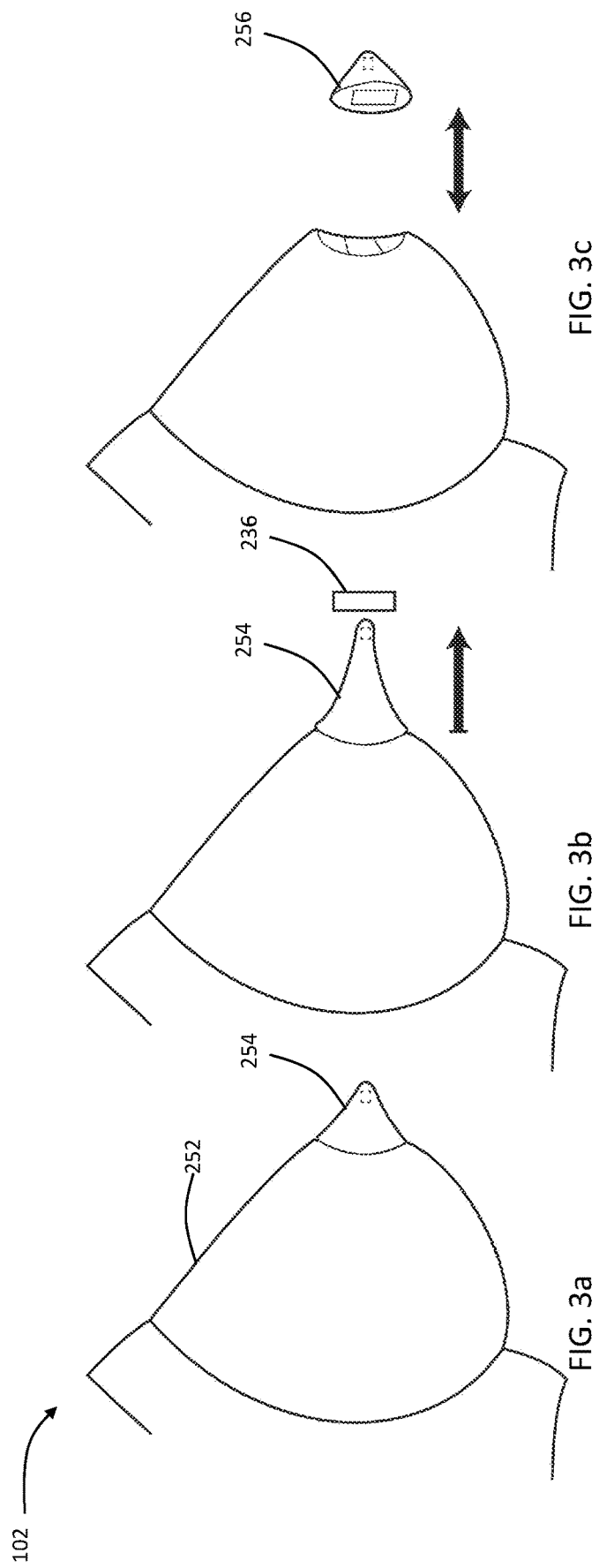

BREASTFEEDING SIMULATION SYSTEM

CROSS-REFERENCE TO RELATED APPLICATIONS

The present patent application is related to and claims the priority benefit of U.S. Provisional Patent Application having Ser. No. 62/659,028, having the title "A BREASTFEEDING SIMULATION SYSTEM" filed Apr. 17, 2018, the contents of which is hereby incorporated by reference in its entirety into the present disclosure.

TECHNICAL FIELD

This invention relates generally to breastfeeding training and more specifically to devices comprised of an instrumented child mannequin and a breast mannequin used for breastfeeding training.

BACKGROUND

This section introduces aspects that may help facilitate a better understanding of the disclosure. Accordingly, these statements are to be read in this light and are not to be understood as admissions about what is or is not prior art.

Even though breastfeeding has been proven to decrease infant obesity and infectious morbidity, a large fraction of mothers discontinue breastfeeding prior to the recommended end point of six months. This decline in breastfeeding is, in part, caused by the pain and soreness that result from incorrect breastfeeding technique. New mothers are not being educated properly due to the reality that a very small number of hospitals in the United States are able to fully support breastfeeding mothers. While prior art breastfeeding training systems exist, example of which is found in U.S. Pat. No. 9,430,955 to Daullary, incorporated by reference herein in its entirety into the present disclosure, these systems lack sufficient feedback to provide an effective system with a visual feedback arrangement for the users.

Therefore, there is an unmet need for a novel breastfeeding arrangement capable of providing a robust visual feedback to its users.

SUMMARY

A breastfeeding simulation system (BSS) is disclosed. The BSS includes a breast prosthesis. The breast prosthesis includes a breast portion and a pliable nipple. The BSS also includes a baby mannequin which is configured to interface with the breast prosthesis. The baby mannequin includes an articulating head. The articulating hear includes a motorized jaw. The articulating head further includes a mouth normally placed in a closed position by the motorized jaw. The motorized jaw opens when an object is detected near the mouth and the baby mannequin is positioned according to a predetermined angular position. The articulating head further includes a palate sensor. The palate sensor is configured to provide a proper placement signal when the pliable nipple is placed at a predetermined position proximate to the palate sensor.

A method of providing breastfeeding simulation is also disclosed. The method includes placing a baby mannequin in a tummy-to-tummy position according to a predetermined angular position. The baby mannequin is configured to interface with a breast prosthesis. The breast prosthesis includes a breast portion and a pliable nipple. The baby mannequin includes an articulating head. The baby mannequin further includes a motorized jaw. The articulating head further includes a mouth normally placed in a closed position by the motorized jaw, where the motorized jaw opens when an object is detected near the mouth and the baby mannequin is positioned according to the predetermined angular position. The articulating head further includes a palate sensor, configured to provide a proper placement signal when a pliable nipple of the breast prosthesis is placed at a predetermined position near the end of the mount. The method further includes placing the breast prosthesis near the mouth of the baby mannequin. In addition, the method includes placing the pliable nipple into the mouth of the baby mannequin.

BRIEF DESCRIPTION OF DRAWINGS

FIGS. 3a, 3b, and 3c are schematics of the breast prosthesis of FIG. 1, showing a pliable nipple in a normal position (FIG. 3a), where the pliable nipple is stretched when in proximity to a magnet placed at the back of the mouth of the baby mannequin (FIG. 3b), and where the pliable nipple is detachable to be replaced by other nipples for diversity of shapes (FIG. 3c).

DETAILED DESCRIPTION

Figure 1:
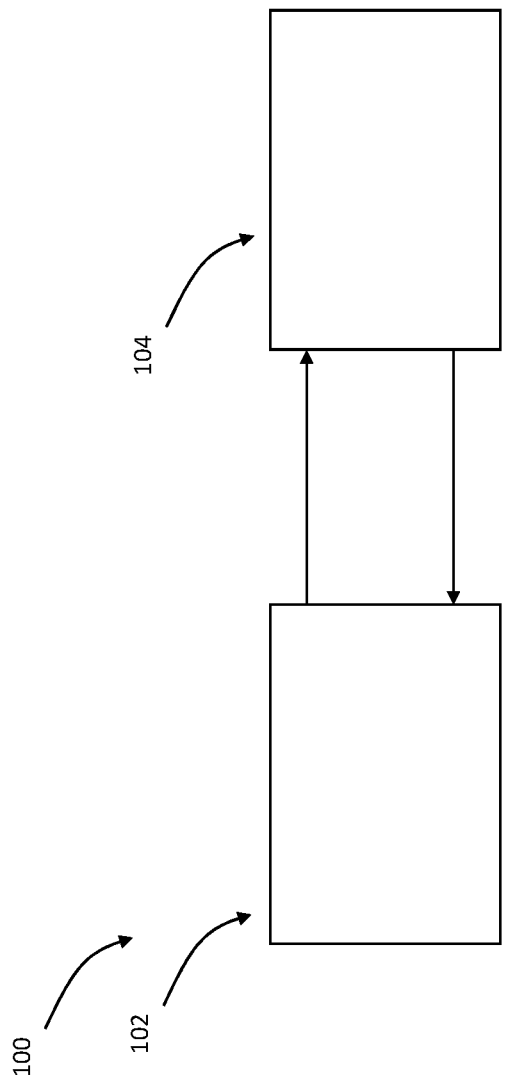
FIG. 1 is a high level block diagram showing a breast simulation system including a baby mannequin and a breast prosthesis.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

In order to improve upon current, insufficient paper and digital education materials, a breastfeeding simulation arrangement was created to train nurses and hospital personnel how to better educate mothers. Referring to FIG. 1, a breastfeeding simulation system 100 is provided which includes two subsystems a breast prosthesis 102 and a baby mannequin 104. The arrows indicate interactions between the two subsystems to provide training information for a user as to the correct baby-breast latching technique. Specifically, the breastfeeding simulation system 100 according to the present disclosure uses sensors to detect and activate verification lights and/or activation of a motorized jaw to indicate accurate execution of steps, such as orientation of baby mannequin 104 and the location of the breast prosthesis 102 relative to the baby mannequin 104. An actual reduction to practice of the system has provided a sensitivity and specificity of about 100% with regards to detection of successful latching. This simulation system provides a hands-on learning experience that allows professionals to more effectively communicate the proper breastfeeding process to new mothers.

Figure 2:
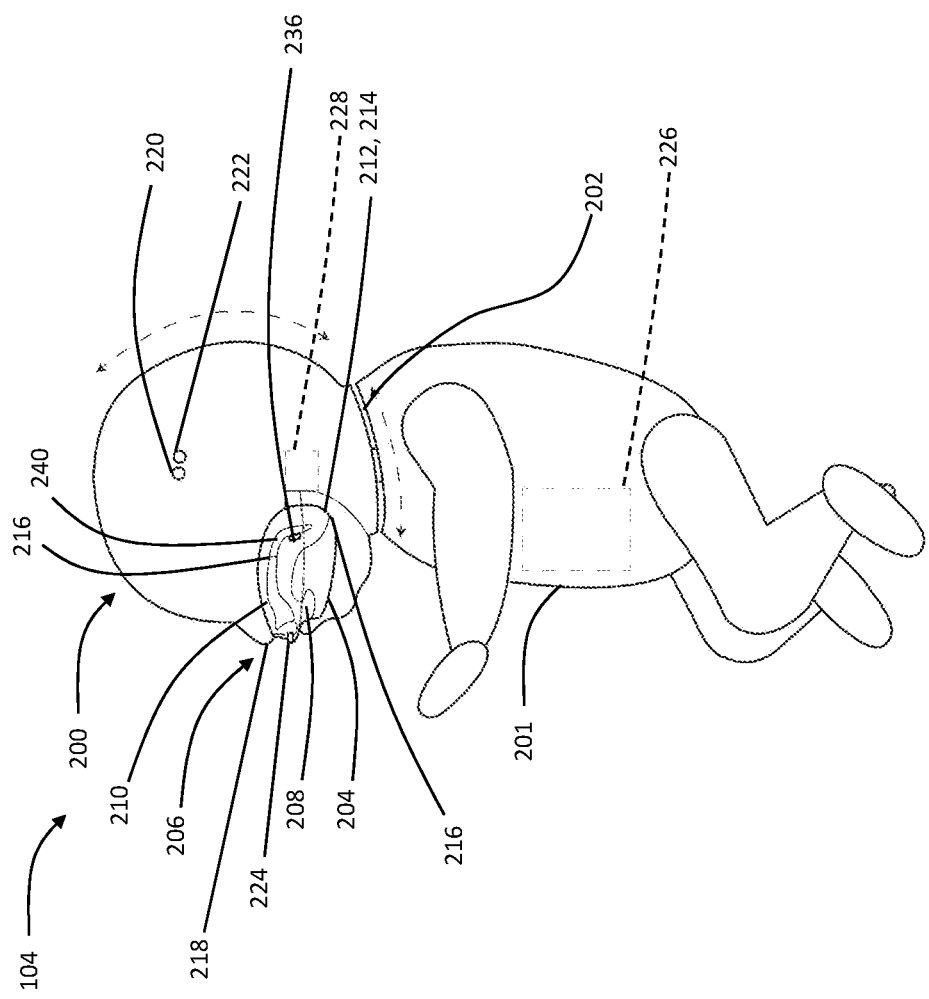
FIG. 2 is a schematic of the baby mannequin of FIG. 1 showing various components of the baby mannequin, including an articulating head, a motorized jaw, and a mouth with anatomically relevant components therein.

Referring to FIG. 2, the baby mannequin 104 is shown which includes an articulating head 200 that is coupled to a body 201 by a head-body member 202. The articulating head 200 is an assembly that contains many of the components of the breastfeeding simulation system 100 as described below and is shaped and sized to simulate the head of a new born to a toddler. The body 201 is also sized and shaped to simulate the body of a newborn or a toddler. The articulation of the articulating head 200 is in the form of a motorized jaw 204 such that according to a first mode when articulated to an open position it reveals a mouth 206 with anatomically representative subcomponents such as a tongue 208 and a hard palate 210 extending to a soft palate 240, further described below, and further according to a second mode when articulating to simulate a suckling motion. In addition, as described further below, the articulating head 200 itself articulates with respect to the body 201 in a similar manner as how a baby's head must be supported (i.e., without support the articulating head 200 can move about the body 201). The mouth 206 as shown in FIG. 2 includes a translucent window positioned about the cheeks into the mouth 206 of the articulating head 200 of the baby mannequin 104 opening for easy inspection by the user of the baby mannequin 104 of the internal components. The internal components are generally sized to a newborn's anatomy, however other sizes may be presented to simulate variations in a newborn's or a toddler's mouth as an alternative embodiment for more advanced training purposes. Similarly the tongue 208 can be sized to also simulate variations in sizes of a newborn's or a toddler's tongue as an alternative embodiment for more advanced training purposes. In general, sizes shown in the figures of the present application are for exemplary purposes, and other dimensions and sizes are envisaged within the scope of the present disclosure that more representative of a human baby and mother as alternative embodiments for more advanced training.

Inside the mouth 206, with reference to FIG. 2, are various anatomically representative members such as the hard palate 210. On either sides of the hard palate 210 are lights 212 and 214 to further assist the user of the breastfeeding simulation system 100 in being able to see inside the mouth 206. A detector 216 (also referred herein as the palate detector or the palate sensor), e.g., a photodetector, is placed proximate to the hard palate 210 or a portion of the mouth 206 indicated as the soft palate 240. A transmitter 218, e.g., a photocell, is placed on or about the mouth 206 and is configured to communicate with the detector 216, such that when the line of sight between the transmitter 218 and the detector 216 is broken, a circuit, discussed below, will detect the interruption and take appropriate actions, as discussed below. The combination transmitter-detector (218-216) can be based on a variety of technologies, including radio frequency (RF), sonar, light, magnetic, and other techniques known to a person having ordinary skill in the art. On the articulating head 200, there are two feedback lights. A first feedback light 220 is placed so that when the baby mannequin 104 is properly positioned, as discussed further below, the first feedback light 220 activates and is clearly visible to the user of the breastfeeding simulation system 100. A second feedback light 222 is also placed so that when the breast prosthesis 102 is properly positioned, as discussed further below, the second feedback light 222 activates and is clearly visible to the user of the breastfeeding simulation system 100. Other components inside the mouth 206 include a magnet 236 at the back of the mouth 206 (described further below) and further at the back of the mouth 206 is a servo motor 228 for moving the motorized jaw 204. The jaw motor 228 can be a stepper motor, a DC motor, and AC motor, or other actuators known to a person having ordinary skill in the art.

Referring to FIG. 3a, a front view of a breast prosthesis 102 is shown. The breast prosthesis 102 includes a breast portion 252 and pliable nipple 254. According to one embodiment, the pliable nipple 254 includes a ferromagnetic material (or another magnet) such that the pliable nipple 254 is configured to stretch when in proximity to a magnet (permanent or activated as an electromagnet) 236. In this embodiment, the magnet 236 is part of the baby mannequin 104 positioned at the end of the mouth 206 near the hard palate 210. As a result, when the breast prosthesis 102 is brought near the baby mannequin 104 and the pliable nipple 254 is placed inside the mouth 206, the pliable nipple 254 once placed in proximity to the magnet 236 stretches in order to allow detection of proper placement. This stretching is shown in FIG. 3b. In case both the pliable nipple 254 and the baby mannequin 104 have magnets for added attraction, the magnets must be configured to provide attractive forces rather than repulsive forces. Comparison of FIGS. 3a and 3b shows elongation of the pliable nipple 254 due to proximity to the magnet 236. The pliable nipple 254 is part of a nipple insert 256 which can be disengaged (e.g., using Velcro) from the breast portion 252 and switched out with another pliable nipple for various aspects of training. The separation of the nipple insert 256 from the breast portion 252 is shown in FIG. 3c. Alternatively, the nipple insert 256 can include the magnet 236 thereby realizing an axial force when the pliable nipple 254 comes in proximity to a ferromagnetic material or another magnet positioned inside the mouth 206.

Figure 3D:
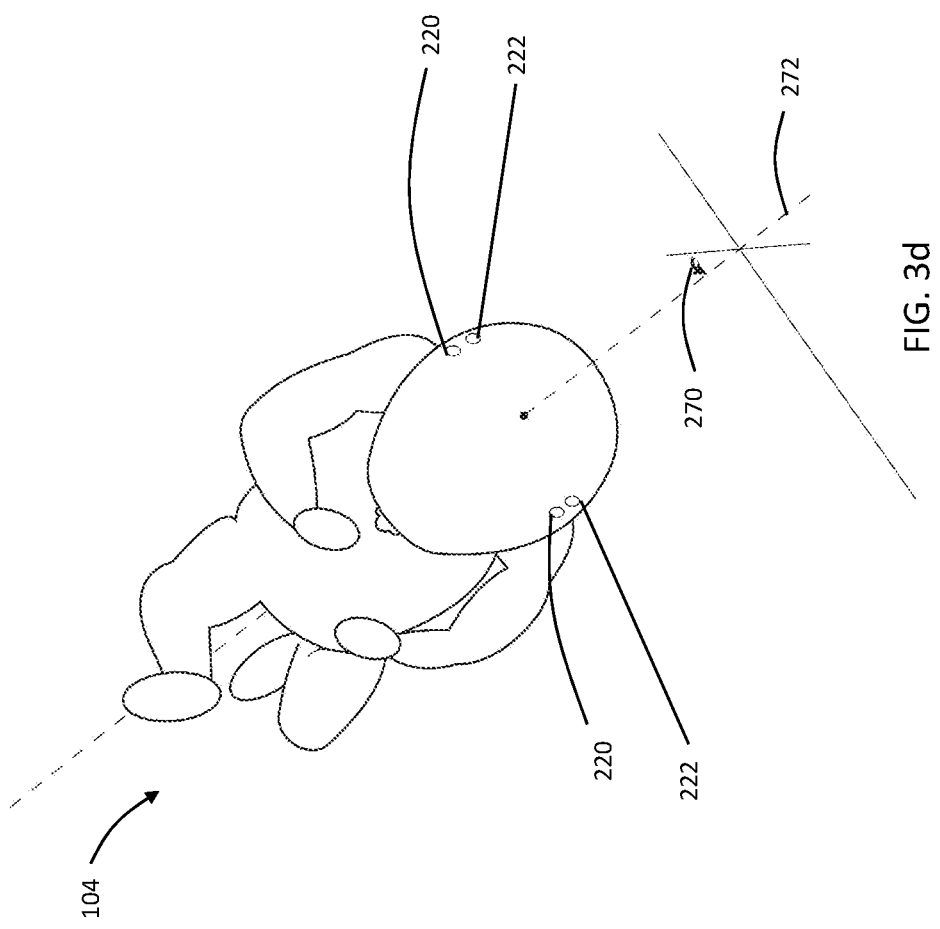
FIG. 3d is a schematic of the baby mannequin of FIG. 1 shown laying according to a predetermined angular position.

Referring to FIG. 3d, the baby mannequin 104 is further provided with a first accelerometer 226 such that rotating the baby mannequin 104 as identified along a longitudinal axis 272 running from the feet to the head of the baby mannequin 104 a predetermined angle 270 about an axis (e.g., the vertical axis) provides signals from the first accelerometer 226 indicative of when the baby mannequin 104 is positioned according to a desired position for lactation training. After calibration about the desired position (e.g., such that the baby mannequin 104 is positioned with its longitudinal axis disposed in a horizontal manner facing the breast prosthesis 102), then when the baby mannequin 104 is positioned about the same positioning as the calibration, the first accelerometer 226 provides a signal that can be used to identify the direction and orientation of the baby mannequin 104 (based on e.g., roll, pitch or yaw). In other words, in response to the signal from the first accelerometer 226 when the baby mannequin is facing the breast prosthesis 102 and the longitudinal axis of the baby mannequin 104 is within about ±30 degrees of the desired position based on roll, pitch or yaw outputs, the first feedback light 220 (e.g., a yellow LED) is activated signaling the proper positioning of the baby mannequin 104. When the baby mannequin 104 is not positioned in this manner, the first feedback light 220 is deactivated. It should be appreciated that more than one accelerometer can be used to provide positional information along not only the one axis, but along a second and even a third axis to thereby signal complete positioning of the baby mannequin 104.

Figure 3E:
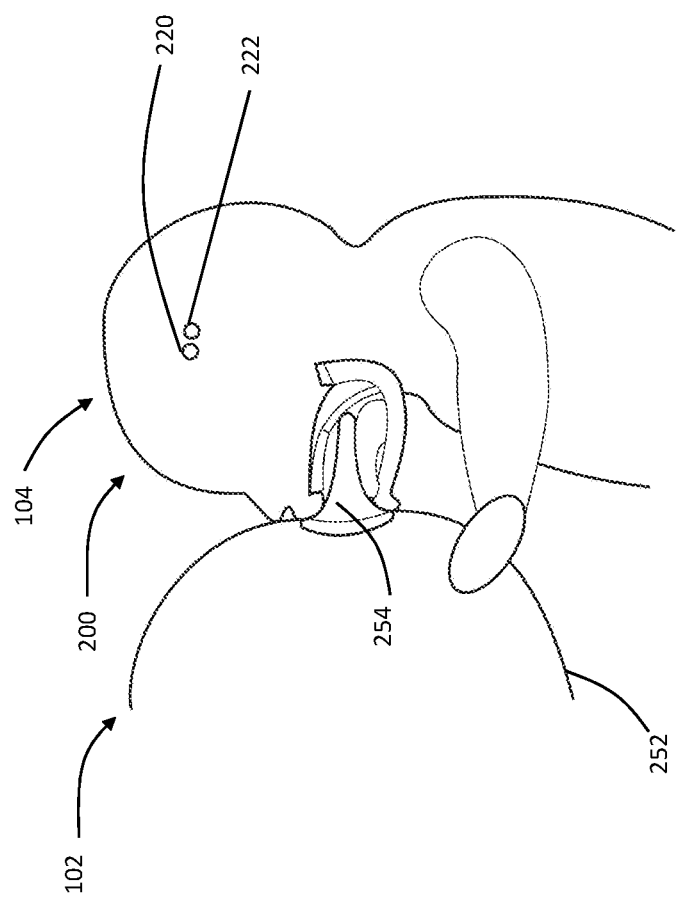
FIG. 3e is a schematic of the baby mannequin of FIG. 1 in a latching position with respect to the breast prosthesis of FIG. 1, whereby the pliable nipple is shown in a stretched position in response to being in proximity to the magnet of FIG. 2.

Referring to FIG. 3e, the baby mannequin 104 is shown in relationship to the breast prosthesis 102, such that the pliable nipple 254 is placed inside the mouth 206 of the baby mannequin 104. With the pliable nipple 254 having stretched due to the magnetic forces, discussed above, combination transmitter-detector (218-216) signal presence of the pliable nipple 254 in the correct position which in turn causes the second feedback light 222 (e.g., a green LED) to be activated alerting the trainee of the correct placement, as discussed above. When the pliable nipple 254 has not been placed in the proper position (e.g., positioned such that it has not broken the path of light from the photocell transmitter 218 and detector 216), then the second feedback light remains deactivated.

In addition to the transmitter-detector (218-216) pair described herein, according to an alternative embodiment, a detector (e.g., a Reed switch, or a photodetector) alone can be used to measure proximity of the pliable nipple 254 to the hard palate 210. In this embodiment, no photocell is provided, and the location of the nipple 254 is not based on breaking a light shown from a transmitter (e.g., a photocell) detected by the photodetector, but rather a change in the value of the detector as the pliable nipple 254 is brought close to the detector. In addition, one or more positional lights (e.g., LEDs 212 and 214) are provided at the back of the mouth to guide placement of the pliable nipple 254 toward the hard palate 210 in a location that will cross the light as described. If two such positional lights 212 and 214 are used, in one embodiment, only one is activated to indicate a low battery condition.

The articulating head 200 also includes the motorized jaw 204 which is configured to maintain the mouth 206 partially or fully closed by a motorized jaw 204 configured to initially provide an opening for the partial placement of the breast prosthesis 102 inside the mouth 206. The baby mannequin 104 also includes a proximity sensor (or lip sensor) 224 disposed about the outside of the mouth 206, e.g., in the area of the upper lip. The signal from the lip sensor 224 is processed by the microprocessor 230 such that when the baby mannequin is positioned correctly (as discussed above) and the lip sensor 224 signals proximity to another object (e.g., the breast prosthesis 102), the microprocessor 230 signals the motorized jaw 204 servo motor 228 (located at the back of the mouth) to open from a closed position (or resting or normally closed position).

The articulating head 200 can be articulated (flexion and extension) in XYZ directions at between about 0 and about 70° about the Z-axis. The articulating head includes mouth partially or fully closed by a motorized jaw configured to initially provide an opening for the partial placement of the prosthetic breast inside the mouth, and at least one photocell-photodetector pair (palate sensor) configured to detect placement of the pliable nipple at the hard palate 210.

The proximity sensor (lip sensor) 224 can be a photodetector, a hall effect sensor, a variable reluctance sensor, a Reed switch, or other proximity sensors known to a person having ordinary skill in the art.

Figure 4:
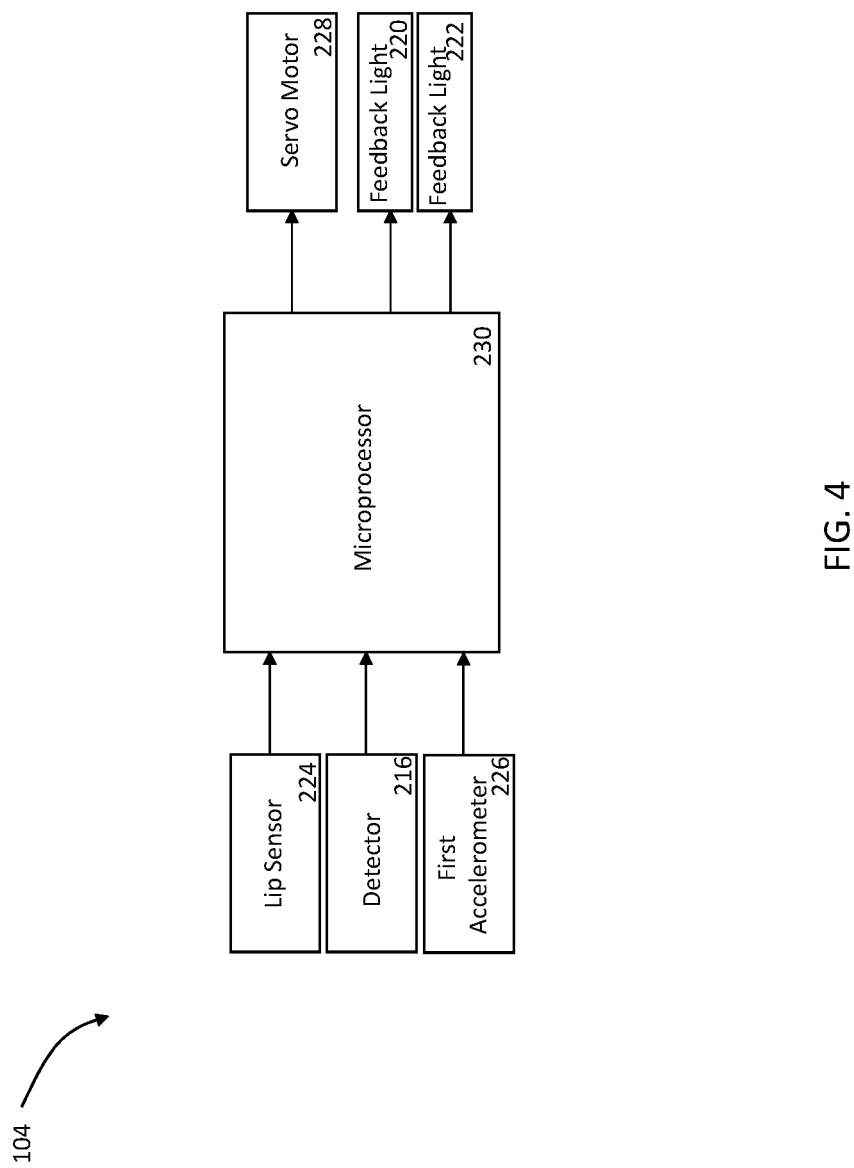
FIG. 4 is a block diagram of various components of the baby mannequin of FIG. 1, in which interrelationship between the components are provided.

Referring to FIG. 4, a partial block diagram of the baby mannequin 104 is shown. Included are the first accelerometer 226, the lip sensor 224, and the detector 216 which signal the microprocessor 230 of the position of the baby mannequin 104, the proximity of the breast prosthesis 102 to the mouth 206, and whether the pliable nipple 254 is properly positioned near the hard palate 210, respectively. Also included are outputs to the servo motor 228, the first feedback light 220, and the second feedback light 222, which include signaling to activate the motorized jaw 204 when the baby mannequin 104 is properly positioned and the lip sensor 224 senses proximity to the breast prosthesis 102, activating the first feedback light 220 when the baby mannequin 104 is properly positioned, and activating the second feedback light 222 when the pliable nipple 254 is properly placed near the hard palate 210, respectively. Other input/output may include power button and associated LED(s).

An exemplary microprocessor 230 is ARDUINO UNO microprocessor powered by a power source (e.g., a lithium polymer battery), however, a host of other microprocessors or microcontrollers, known to a person having ordinary skill in the art can also be utilized.

Figure 5:
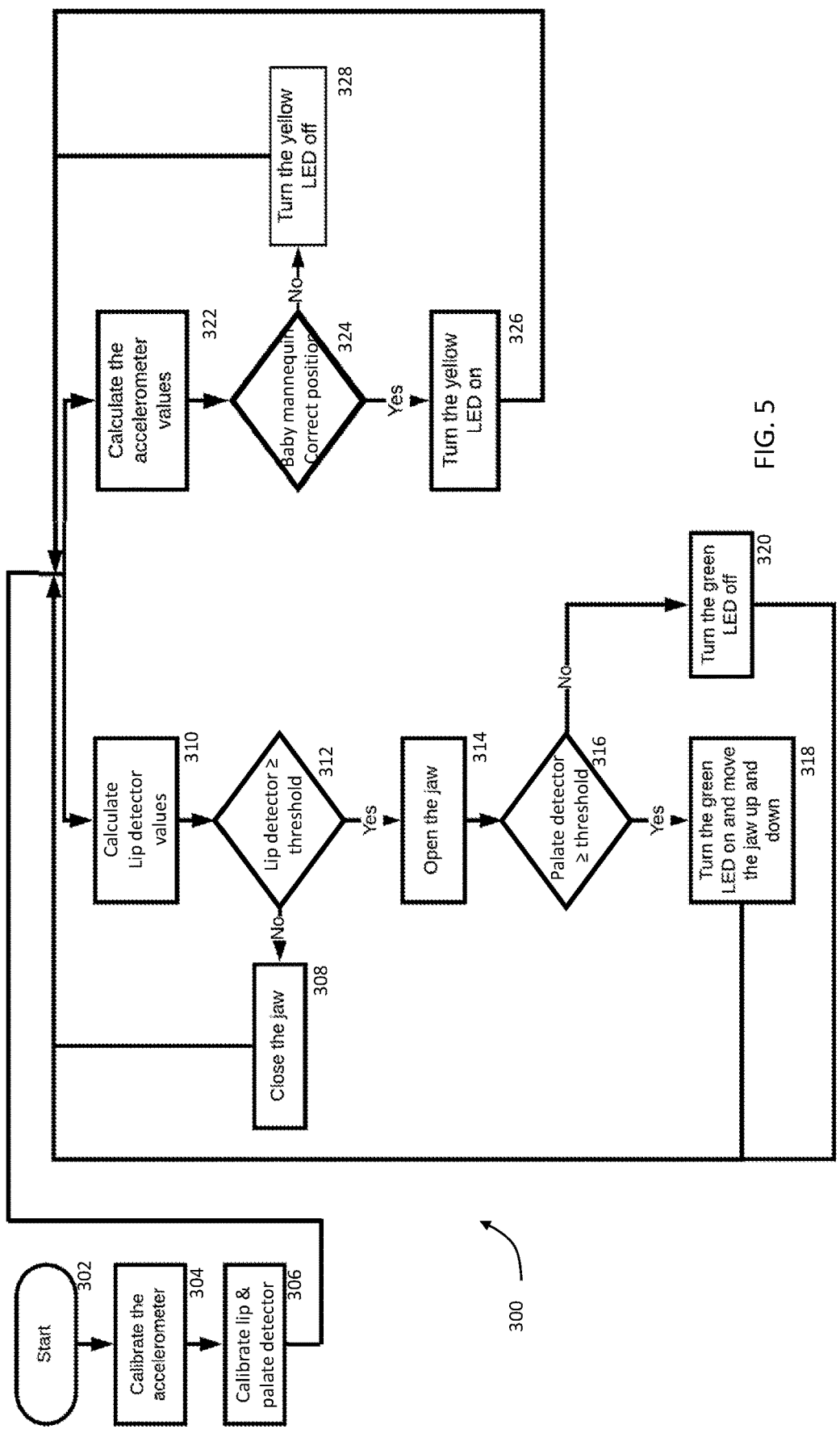
FIG. 5 is a flowchart of the operations steps taken by the BSS in its normal operational conditions, including proper placement of the baby mannequin according to the predetermined angular position of FIG. 3d and proper positioning of the pliable nipple inside the mouth of the baby mannequin of FIG. 2.
Figure 6:
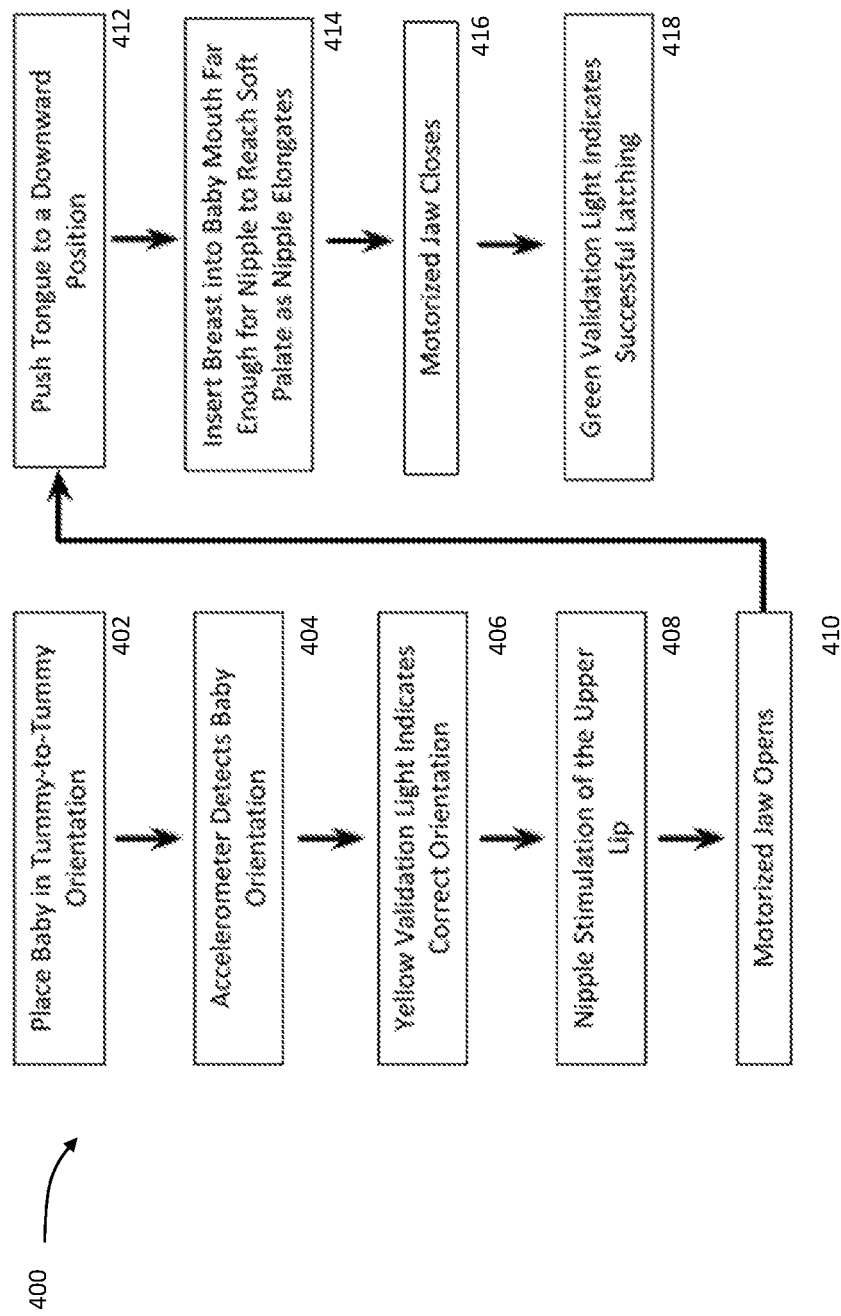
FIG. 6 is a block diagram of the steps taken by a user of the BSS of FIG. 1, including steps associated with proper placements of the baby mannequin according to the predetermined angular position and proper positioning of the breast prosthesis.

Referring to FIGS. 5 and 6, flowcharts are shown describing the process by which the baby mannequin 104 and the breast prosthesis 102 interact with each other. Referring to FIG. 5, the method 300 begins at block 302. Then, according to the present disclosure the method 300 includes initially calibrating the first accelerometer 226 (or as many accelerometers there are in the system) in block 304 and the transmitter-detector (218-216) as well as the lip sensor 224 (referred in FIG. 4 as detector) in block 306. Afterwards, the method 300 calculates differential lip sensor/detector values and accelerometer values in separate branches starting on blocks 310 and 322. In the right-hand side branch, monitoring the accelerometer values the method ascertains whether the baby mannequin 104 is placed in a desired position (i.e., where the longitudinal axis of the baby mannequin is within about ±30 degrees of the desired position as described above) on the decision block 324. If so, then the method turns on the yellow feedback light (first feedback light 220) indicating a successful positioning of the baby mannequin 104. If not, the yellow light (first feedback light 220) is turned off. The right branch is then returned to the top of two branches. The left branch is dedicated to sensing whether the pliable nipple 254 of the breast prosthesis 102 is properly positioned. First the differential lip sensor/detector values are calculated in block 310. After the differential lip sensor/detector values are calculated, initially the method 300 ascertains whether the lip sensor 224 has crossed a threshold in the decision block 312. If so, the microprocessor 230 commands the motorized jaw 204 to open revealing the inside of the mouth 206 in block 314. If not, the microprocessor 230 commands the motorized jaw 204 to close in block 308. Once the motorized jaw 204 is open, then the method 300 ascertains whether the palate detector 216 has detected presence of the pliable nipple 254 in the path of transmitter-detector (218-216) in decision block 316. If the answer is yes, then the green LED light (second feedback light 222) is turned on in block 318. In addition, optionally the motorized jaw 204 begins a cyclic motion of partially opening and closing to simulate a suckling action. If the answer to the decision block 316 is no, then the green LED light (second feedback light 222) is turned off in block 320. The method 300 then returns to the top of the two branches.

Referring to FIG. 6, a more streamlined method 400 is shown as a flowchart for the operation of the breastfeeding simulation system 100, according to the present disclosure. The method 400 starts by placing the baby mannequin 104 in a tummy-to-tummy orientation in block 402. In that orientation, the first accelerometer 226 detects the position of the baby mannequin 104 and signals the microprocessor 230 accordingly in block 404 and in response thereto, the microprocessor 230 activates the first feedback light 220 in step 406. Next, the lip sensor 224 detects position of the breast prosthesis 102 and in particular the pliable nipple 254 and signals the microprocessor 230, accordingly in block 408. Next the microprocessor 230 signals the motorized jaw 204 to open up in block 410. Next, the trainee is instructed to push the tongue 208 to a downward position in block 412. Next, the trainee is asked to insert the pliable nipple 254 into the mouth 206 in block 414. Once the detector 216 has detected position of the pliable nipple 254, the motorized jaw 204 is commanded closed (an optionally into a cyclic partially closed and open simulation of a suckling motion) in block 416. Finally, the green validation light (the second feedback light 222) is activated to indicate successful latching in block 418.

Current prior art market products do not incorporate anatomical correctness with an active learning approach, innovation of this device lies within its ability to actively and accurately detect baby orientation and incorporate this factor into validation of the correct latching process. Along with established guidelines for lactating mother and baby care, this solution will aid hospitals in fulfilling the internationally acclaimed Baby Friendly Initiative, improve hospital quality of care, and ultimately improve the health of mothers and babies across the country.

Those having ordinary skill in the art will recognize that numerous modifications can be made to the specific implementations described above. The implementations should not be limited to the particular limitations described. Other implementations may be possible.

The invention claimed is:

1. A breastfeeding simulation system, comprising:
a breast prosthesis having a pliable nipple; and
a baby mannequin configured to interface with the breast prosthesis, the baby mannequin including:
an articulating head; and
a motorized jaw, the articulating head further comprising
a mouth normally placed in a closed position by the motorized jaw, where the motorized jaw opens when an object is detected near the mouth and the baby mannequin is positioned according to a predetermined angular position, and
a palate sensor, configured to provide a proper placement signal when the pliable nipple is placed at a predetermined position.

2. The breastfeeding simulation system of claim 1, the baby mannequin detects proximity of an object by a lip sensor.

3. The breastfeeding simulation system of claim 2, the baby mannequin further comprising at least one accelerometer.

4. The breastfeeding simulation system of claim 3, after calibration of the at least one accelerometer in response to a desired position of the baby mannequin, a first feedback light is activated in response to signals from the at least one accelerometer when the baby mannequin is positioned within about ±30 degrees of a predetermined position based on one or more of roll, pitch and yaw data provided by the at least one accelerometer,
wherein about is defined as a degree of variability within 10% of said range.

5. The breastfeeding simulation system of claim 4, the articulating head further comprising a second feedback light which is activated when the palate sensor provides the proper placement signal.

6. The breastfeeding simulation system of claim 5, the baby mannequin further comprises a microprocessor configured to receive signals from the at least one accelerometer, the palate sensor, and the lip sensor and in response thereto generate control signals for the motorized jaw, the first feedback light, and the second feedback light.

7. The breastfeeding simulation system of claim 1, further configured to provide a suckling motion by the motorized jaw when the palate sensor indicates a proper placement of the pliable nipple.

8. The breastfeeding simulation system of claim 1, wherein the pliable nipple is terminated with a first magnet such that when the pliable nipple is placed inside the mouth, a magnetic biasing force causes elongation of the pliable nipple towards one of a ferromagnetic surface, a second magnet, or a combination thereof.

9. The breastfeeding simulation system of claim 1, wherein the pliable nipple is detachable from the breast prosthesis and replaceable by another pliable nipple in order to provide diversity of sizes and shapes.

10. The breastfeeding simulation system of claim 1, the articulating head further comprising translucent windows disposed on opposite sides of the mouth and lights within the mouth to further illuminate inside structure of the mouth.

11. A method of providing breastfeeding simulation, comprising:
placing a baby mannequin which is configured to interface with a breast prosthesis in a tummy-to-tummy position according to a predetermined angular position, the baby mannequin comprising:
an articulating head; and
a motorized jaw, the articulating head further comprising
a mouth normally placed in a closed position by the motorized jaw, where the motorized jaw opens when an object is detected near the mouth and the baby mannequin is positioned according to the predetermined angular position, and
a palate sensor, configured to provide a proper placement signal when a pliable nipple of the breast prosthesis is placed at a predetermined position near the end of the mount;
placing the breast prosthesis near the mouth of the baby mannequin; and
placing the pliable nipple into the mouth of the baby mannequin.

12. The method of claim 11, further comprising:
detecting proximity of an object by a lip sensor.

13. The method of claim 12, further comprising:
sensing position of the baby mannequin using at least one accelerometer.

14. The method of claim 13, further comprising:
calibrating the at least one accelerometer;
activating a first feedback light in response to signals from the at least one accelerometer when the baby mannequin is positioned within about ±30 degrees of a predetermined position based on one or more of roll, pitch and yaw data provided by the at least one accelerometer, wherein about is defined as a degree of variability within 10% of said range.

15. The method of claim 14, further comprising:
activating a second feedback light when the palate sensor provides a proper placement signal of the pliable nipple.

16. The method of claim 15, further comprising:
receiving signals from the at least one accelerometer, the palate sensor, and the lip sensor by a microprocessor and in response thereto generating control signals for the motorized jaw, the first feedback light, and the second feedback light.

17. The method of claim 11, further comprising:
controlling the motorized jaw to generate a suckling motion when the palate sensor indicates a proper placement of the pliable nipple.

18. The method of claim 11, wherein the pliable nipple is terminated with a first magnet such that when the pliable nipple is placed inside the mouth, a magnetic biasing force causes elongation of the pliable nipple towards one of a ferromagnetic surface, a second magnet, or a combination thereof.

19. The method of claim 11, further comprising:
detaching the pliable nipple from the breast prosthesis; and placing a replacement pliable nipple on the breast prosthesis in order to provide diversity of sizes and shapes.

20. The method of claim 11, further comprising:
activating lights within the mouth to further illuminate inside structure of the mouth through translucent windows disposed on opposite sides of the mouth.

* * * * *